(12) United States Patent
Armstrong et al.

(10) Patent No.: US 7,000,051 B2
(45) Date of Patent: Feb. 14, 2006

(54) APPARATUS AND METHOD FOR VIRTUALIZING INTERRUPTS IN A LOGICALLY PARTITIONED COMPUTER SYSTEM

(75) Inventors: William Joseph Armstrong, Rochester, MN (US); Richard Louis Arndt, Austin, TX (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/403,158

(22) Filed: Mar. 31, 2003

(65) Prior Publication Data

US 2004/0205272 A1   Oct. 14, 2004

(51) Int. Cl.
*G06F 13/24* (2006.01)
*G06F 9/45* (2006.01)

(52) U.S. Cl. .................. 710/267; 710/269; 712/203; 717/149; 719/324

(58) Field of Classification Search ............ 710/5, 710/19, 260, 261, 267; 717/176, 129, 148; 718/1, 100, 107; 719/318; 711/209; 712/244
See application file for complete search history.

(56) References Cited

U.S. PATENT DOCUMENTS

| | | | |
|---|---|---|---|
| 4,400,769 A | * | 8/1983 | Kaneda et al. .......... 710/267 |
| 4,742,447 A | * | 5/1988 | Duvall et al. ............ 718/1 |
| 5,095,427 A | | 3/1992 | Tanaka et al. |
| 5,187,802 A | * | 2/1993 | Inoue et al. ............ 718/107 |
| 5,325,525 A | | 6/1994 | Shan et al. |
| 5,325,526 A | | 6/1994 | Cameron et al. |
| 5,357,632 A | | 10/1994 | Pian et al. |
| 5,361,375 A | * | 11/1994 | Ogi ..................... 718/1 |
| 5,481,747 A | | 1/1996 | Kametani |
| 5,504,670 A | | 4/1996 | Barth et al. |
| 5,535,321 A | | 7/1996 | Massaro et al. |
| 5,574,914 A | | 11/1996 | Hancock et al. |
| 5,659,786 A | | 8/1997 | George et al. |

(Continued)

FOREIGN PATENT DOCUMENTS

JP   2001188685   7/2001

OTHER PUBLICATIONS

U.S. Appl. No. 09/838,057, "Method and Apparatus for Allocating Processor Resources in a Logically Partitioned Computer System,", Armstrong et al., filed Apr. 19, 2001, (Continued)

*Primary Examiner*—Glenn A. Auve
*Assistant Examiner*—Christopher E. Lee
(74) *Attorney, Agent, or Firm*—Martin & Associates, LLC; Derek P. Martin

(57) ABSTRACT

A resource and partition manager virtualizes interrupts without using any additional hardware in a way that does not disturb the interrupt processing model of operating systems running on a logical partition. In other words, the resource and partition manager supports virtual interrupts in a logically partitioned computer system that may include share processors with no changes to a logical partition's operating system. A set of virtual interrupt registers is created for each virtual processor in the system. The resource and partition manager uses the virtual interrupt registers to process interrupts for the corresponding virtual processor. In this manner, from the point of view of the operating system, the interrupt processing when the operating system is running in a logical partition that may contain shared processors and virtual interrupts is no different that the interrupt processing when the operating system is running in computer system that only contains dedicated processor partitions.

18 Claims, 9 Drawing Sheets

U.S. PATENT DOCUMENTS

| | | | |
|---|---|---|---|
| 5,692,193 A | | 11/1997 | Jagannathan et al. |
| 5,694,606 A | * | 12/1997 | Pletcher et al. ............. 710/261 |
| 5,872,963 A | | 2/1999 | Bitar et al. |
| 5,898,855 A | * | 4/1999 | Onodera et al. ............... 718/1 |
| 5,978,830 A | | 11/1999 | Nakaya et al. |
| RE36,462 E | * | 12/1999 | Chang et al. ............... 711/209 |
| 6,078,970 A | * | 6/2000 | Nordstrom et al. ........... 710/19 |
| 6,105,050 A | | 8/2000 | Govindaraju et al. |
| 6,195,676 B1 | | 2/2001 | Spix et al. |
| 6,199,093 B1 | | 3/2001 | Yokoya |
| 6,247,109 B1 | | 6/2001 | Kleinsorge et al. |
| 6,269,391 B1 | | 7/2001 | Gillespie |
| 6,279,046 B1 | * | 8/2001 | Armstrong et al. ............. 710/5 |
| 6,381,742 B1 | * | 4/2002 | Forbes et al. ............... 717/176 |
| 6,418,460 B1 | | 7/2002 | Bitar et al. |
| 6,487,654 B1 | * | 11/2002 | Dowling ..................... 712/244 |
| 6,542,926 B1 | | 4/2003 | Zalewski et al. |
| 6,587,938 B1 | | 7/2003 | Eilert et al. |
| 6,598,069 B1 | | 7/2003 | Rooney et al. |
| 6,615,303 B1 | * | 9/2003 | Endo et al. ................. 710/260 |
| 6,625,638 B1 | | 9/2003 | Kubala et al. |
| 6,647,508 B1 | | 11/2003 | Zalewski et al. |
| 6,711,605 B1 | * | 3/2004 | Sekiguchi et al. .......... 718/100 |
| 6,760,783 B1 | * | 7/2004 | Berry ......................... 719/318 |
| 6,779,065 B1 | * | 8/2004 | Murty et al. ................ 710/260 |
| 2001/0014905 A1 | | 8/2001 | Onodera |
| 2002/0056076 A1 | * | 5/2002 | Made ......................... 717/129 |
| 2003/0014466 A1 | | 1/2003 | Berger et al. |
| 2003/0101440 A1 | * | 5/2003 | Hardin et al. ............... 717/148 |

OTHER PUBLICATIONS

IBM Corporation, S/390 Processor Resource/Systems Manager Planning Guide (IBM Pub. No. GA22-7236-04, 5th Edition, Mar. 1999).

David L. Black, "Scheduling Support for Concurrency and Parallelism in the Mach Operating System," Computer, IEEE Computer Society, vol. 23, No. 5, May 1, 1990.

T. L. Borden et al., "Multiple Operating Systems on One Processor Complex," IBM Systems Journal, vol. 28, No. 1, 1989, pp. 104-122.

Menasce, D. et al. "Capacity Planning and Performance Modeling", ISBN 0-13-035494-5, © 1994.

Leutenegger et al. "A Modeling Study of the TPC-C Benchmark", Proceedings of the 1993 ACM SIGMOD Int'l Conference on Management of Data, 1993, pp. 22-31.

Levine, C. "Order-of-Magnitude Advantage on TPC-C Through Massive Parallelism", Proceedings of the 1995 ACM SIGMOD Int'l Conference on Management of Data, 1995, pp. 464-465.

IBM Corporation, "AS/400 Logical Partitiond Hardware Planning Guide", © 1999.

Schimunek, G. et al. "Slicing the AS/400 With Logical Partitioning: A How to Guide", Aug. 1999.

IBM Corporation, "LPAR Configuration and Management", First Edition, © Apr. 2002.

Bakshi et al., "Partitioning and Pieplining for Performance-Costrained Hardware/Software Systems," 1999 IEEE, pp. 419-432.

Ayachi et al., "Hierarchical Processor Scheduling Policy for Multiprocessor Systems," 1996 IEEE, pp. 100-109.

Marisa Gil et al., "The Enhancement of a User-level Thread Package Scheduling on Multiprocessors," Sep. 1994, Euromicro Workshop on Parallel and Distributed Processing, pp. 228-236.

IBM AS/400e Logical Partitions: Learning About. © 1999, 2000. http://publib.boulder.ibm.com/pubs/html/as400/v4r5/ic2924/info/rzajx.pdf.

IBM AS/400e Logical Partitions: Planning for. © 1999, 2000. http://publib.boulder.ibm.com/pubs/html/as400/v4r5/ic2924/info/rzait.pdf.

IBM AS/400e Logical Partitions: Creating. © 1999, 2000. http://publib.boulder.ibm.com/pubs/html/as400/v4r5/ic2924/info/rzaj7.pdf.

IBM AS/400e Logical Partitions: Managing. © 1999, 2000. http://publib.boulder.ibm.com/pubs/html/as400/v4r5/ic2924/info/rzaj6.pdf.

IBM AS/400e Logical Partitions: Troubleshooting. © 1999, 2000. http://publib.boulder.ibm.com/pubs/html/as400/v4r5/ic2924/info/rzaj8.pdf.

* cited by examiner

Logical Partitions with Dedicated Processors 700

| Interrupt Management Interface | Service |
|---|---|
| h_xirr | Read XIRR with side effects of processor that received an interrupt. New value of CPPR = priority of accepted interrupt. |
| h_cppr | Set CPPR on invoking processor to the specified value. |
| h_ipoll | Poll XIRR and MFRR on specified target processor to check for pending interrupts |
| h_ipi | Send IPI to specified target processor by writing associated MFRR with specified value |
| h_eoi | Signal end of interrupt to interrupt H/W by writing specified XIRR value to associated XIRR |

FIG. 7  Prior Art

Logical Partitions with Shared Processors 900

| Interrupt Management Interface | Service |
|---|---|
| h_xirr | Read calling processor's XIRR with side effects. Virtual processor's virtual CPPR = priority of interrupt taken by the partition. |
| h_cppr | Set calling processor's virtual CPPR to the specified value. |
| h_ipoll | Poll target virtual processor's virtual XIRR and virtual MFRR registers to check for pending interrupts |
| h_ipi | Send IPI to specified virtual target processor by writing associated virtual MFRR with specified value. |
| h_eoi | Signal end of interrupt to interrupt H/W by writing specified XIRR value to associated XIRR on the physical processor on which the call was made. |

FIG. 9

APPARATUS AND METHOD FOR VIRTUALIZING INTERRUPTS IN A LOGICALLY PARTITIONED COMPUTER SYSTEM

BACKGROUND OF THE INVENTION

1. Technical Field

This invention generally relates to data processing, and more specifically relates to logically partitioned computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The eServer computer system developed by IBM is an example of a computer system that supports logical partitioning. If logical partitioning on an eServer computer system is desired, resource and partition manager code (referred to as a "hypervisor" in eServer terminology) is installed that allows defining different computing environments on the same platform. Once the resource and partition manager is installed, logical partitions may be created that define different computing environments. The resource and partition manager manages the logical partitions to assure that they can share needed resources in the computer system while maintaining the separate computing environments defined by the logical partitions.

A computer system that includes multiple logical partitions typically shares resources between the logical partitions. For example, in a computer system with a single CPU, two logical partitions could be defined such that 50% of the CPU is allocated to each partition, 33% of the memory to the first partition and 67% of the memory to the second partition, and two different I/O slots to the two logical partitions, one per partition. Once logical partitions are defined and shared resources are allocated to the logical partitions, each logical partition acts as a separate computer system. Thus, in the example above that has a single CPU with two logical partitions in a computer system, the two logical partitions will appear for all practical purposes to be two separate and distinct computer systems.

An issue that arises with a logically partitioned computer system is how to handle interrupts. A processor typically includes interrupt registers that are used to determine when and how to handle interrupts. In a computer system that has no logical partitions, a processor may be coupled directly to I/O hardware so that the processor processes all interrupts generated by the I/O hardware. In a logically partitioned computer system, however, a processor cannot be coupled directly to I/O hardware because I/O interrupts could occur for different physical processors and/or for different virtual processors. For this reason, some mechanism is required in a logically partitioned computer system to handle interrupts. In the prior art, interrupts are supported in a logically partitioned computer system by complex software (known as a "hypervisor" in eServer terminology) that interacts with the interrupt registers on a physical processor to handle interrupts. In a logically partitioned computer system with dedicated processors, an interrupt management interface is provided in the hypervisor that provides functions that may be called by an operating system in a logical partition to process interrupts. These functions typically interact with the physical processor registers for the dedicated processor corresponding to a logical partition. These functions do not work with logical partitions that share a processor because the processor's physical registers are not dedicated to a particular logical partition. In addition, the prior art provides no way to process a virtual interrupt (generated in software) without changing interrupt handling in a partition. Without a way to process interrupts in a logically partitioned computer system that includes shared processors and without a way to process virtual interrupts, the computer industry will continue to suffer from mechanisms and methods that unduly limit the capabilities of a logically partitioned computer system.

DISCLOSURE OF INVENTION

A resource and partition manager of the preferred embodiments virtualizes interrupts without using any additional hardware in a way that does not disturb the interrupt processing model of operating systems running on a logical partition. In other words, the resource and partition manager supports virtual interrupts in a logically partitioned computer system that may include share processors with no changes to a logical partition's operating system. A set of virtual interrupt registers is created for each virtual processor in the system. The resource and partition manager uses the virtual interrupt registers to process interrupts for the corresponding virtual processor. In this manner, from the point of view of the operating system, the interrupt processing when the operating system is running in a logical partition that may contain shared processors and virtual interrupts is no different that the interrupt processing when the operating system is running in computer system that only contains dedicated processor partitions.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a block diagram showing prior art services provided by the interrupt management interface of FIG. 6;

FIG. 9 is a block diagram showing services provided by the interrupt management interface of FIG. 8 in accordance with the preferred embodiments.

BEST MODE FOR CARRYING OUT THE INVENTION

According to preferred embodiments of the present invention, an interrupt management mechanism virtualizes interrupts in a computer system that includes multiple logical partitions. The virtualization of interrupts allows each operating system in each logical partition to operate according to its interrupt processing model when it runs in a system with only dedicated processor partitions. In other words, the interrupt management mechanism makes the fact that shared processor partitions or virtual interrupts are present transparent from the point of view of the operating systems in the logical partitions. The interrupt management mechanism receives an interrupt from the interrupt hardware or from software, determines which virtual processor needs to process the interrupt, and uses a set of virtual interrupt registers corresponding to the virtual processor to process the interrupt. In this manner, each virtual processor maintains its own corresponding set of virtual interrupt registers.

Figure 1:
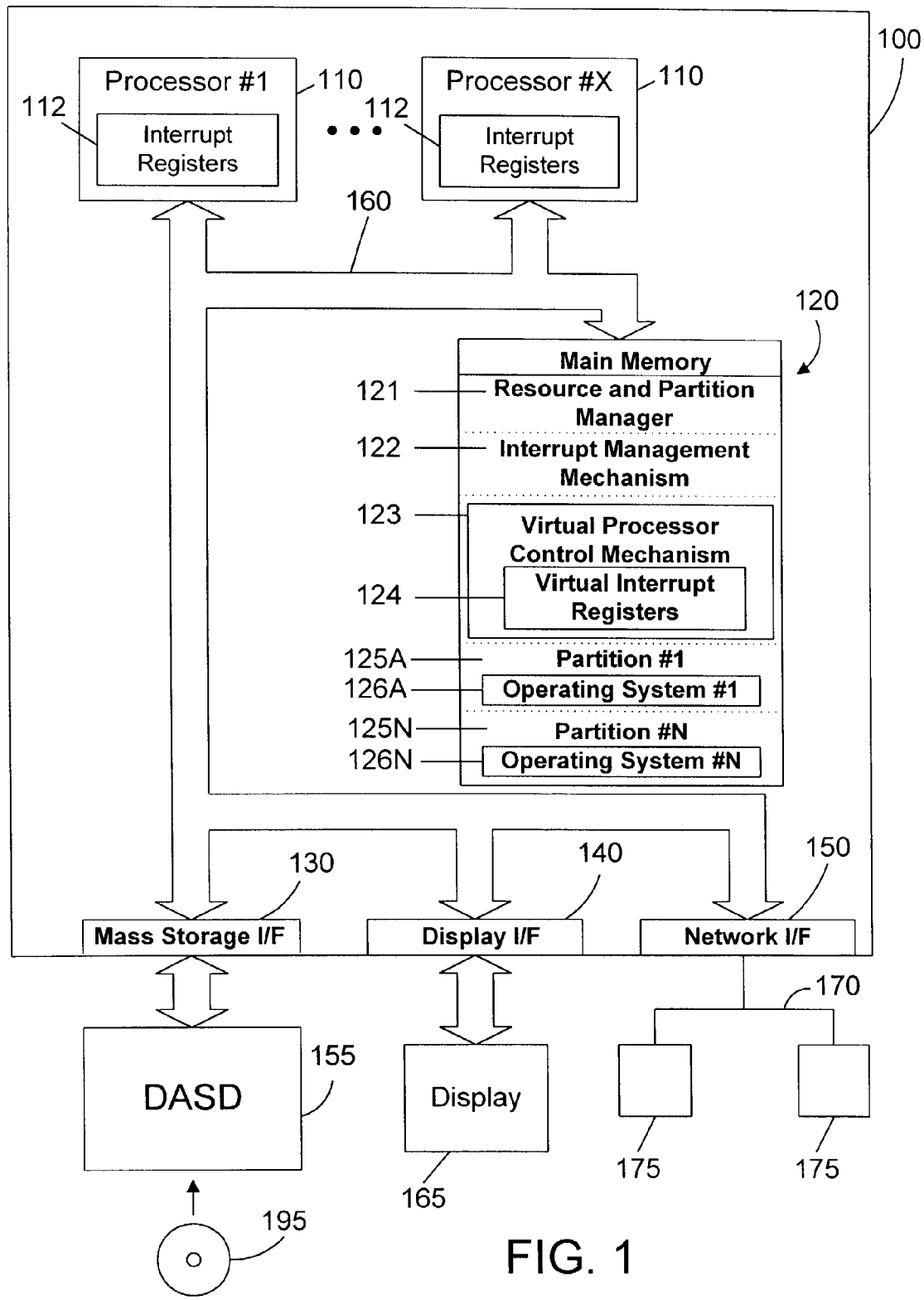
FIG. 1 is a block diagram of a computer apparatus that supports logical partitioning and virtual interrupts in accordance with the preferred embodiments.

Referring to FIG. 1, a computer system 100 is an enhanced IBM eServer computer system, and represents one suitable type of computer system that supports logical partitioning and interrupt handling in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains a resource and partition manager 121, an interrupt management mechanism 122, a virtual processor control mechanism 123, and N logical partitions 125, shown in FIG. 1 as logical partitions 125A through 125N. Resource and partition manager 121 preferably creates these N logical partitions 125. The interrupt management mechanism 122 provides an interface that receives interrupts from the I/O hardware, and that processes these interrupts so they are handled by the appropriate virtual processor. Virtual processor control mechanism 123 preferably includes one or more sets of virtual interrupt registers 124. In the most preferred embodiments, there is a set of virtual interrupt registers 124 corresponding to each virtual processor defined in the logical partitions 125. The virtual processor control mechanism 123 interacts with the interrupt management mechanism 122 to determine which virtual processor should handle a pending interrupt, and handles the interrupt according to the set of virtual interrupt registers 124 corresponding to the virtual processor that will handle the interrupt.

Each logical partition preferably includes a corresponding operating system 126, shown in FIG. 1 as operating systems 126A through 126N. Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150 and system bus 160. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partitions 125A–125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources. Thus, one partition could be defined to include two processors and a portion of memory 120, along with one or more I/O processors that can provide the functions of mass storage interface 130, display interface 140, or network interface 150. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the resource and partition manager 121, the interrupt management mechanism 122, and the virtual processor control mechanism 123 preferably reside in memory and hardware separate from the partitions and are facilities and mechanisms that are not directly available to the partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while resource and partition manager 121, the interrupt management mechanism 122, the virtual processor control mechanism 124, and the partitions 125A–125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Each processor 110 may be constructed from one or more microprocessors and/or integrated circuits. Each processor 110 preferably includes a set of interrupt registers 112 that dictate how processor 110 handles interrupts. A processor 110 executes program instructions stored in main memory 120. Main memory 120 stores programs and data that processors 110 may access. When computer system 100 starts up, a processor 110 initially executes the program instructions that make up the resource and partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in eServer input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
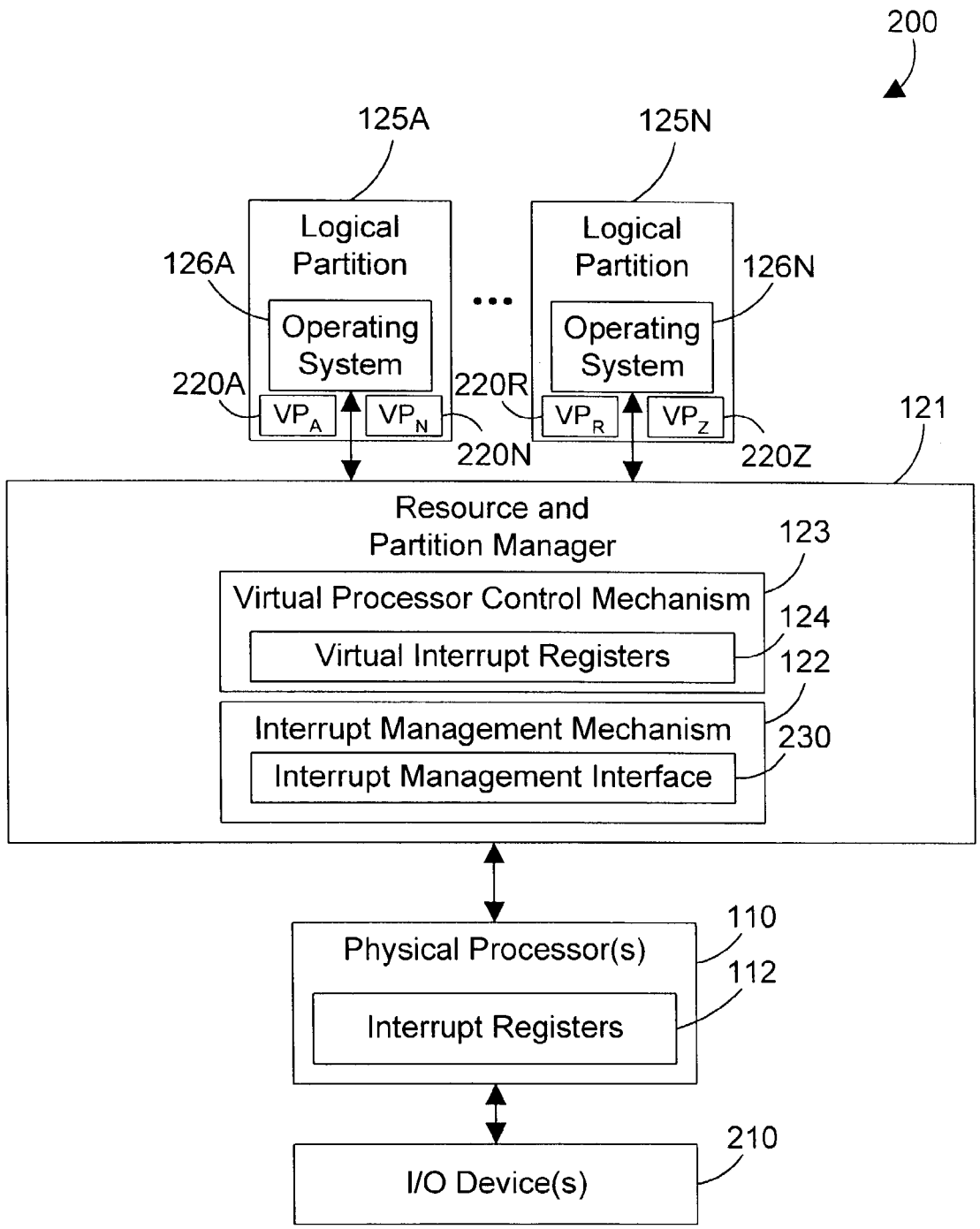
FIG. 2 is a block diagram showing a logical view of some of the components in FIG. 1 in accordance with the preferred embodiments.

FIG. 1 shows a sample computer system that shows some of the salient features of both hardware and software in accordance with the preferred embodiments. A more detailed logical view of some of the components in FIG. 1 is shown as system 200 in FIG. 2. Each logical partition 125 includes an operating system 126, and defines one or more virtual processors 220. In FIG. 2, logical partition 125A is shown to contain virtual processors 220A and 220N, while logical partition 125N is shown to contain virtual processors 220R and 220Z. Note that each logical partition may include from 1 to any suitable number of virtual processors.

The logical partitions 125 communicate with resource and partition manager 121. Resource and partition manager 121 manages the logical partitions. One suitable implementation for resource and partition manager 121 is referred to as a "hypervisor" in IBM terminology. Resource and partition manager 121 preferably includes a virtual processor control mechanism 123 that includes one or more virtual interrupt registers 124. The interrupt management mechanism 122 within the resource and partition manager 121 receives interrupts from the physical processors 110, which receive the interrupts from interrupt hardware generically referred to in FIG. 2 as I/O devices 210. When a physical processor 110 receives an interrupt from I/O devices 210, it doesn't know which logical partition or virtual processor should handle the interrupt, so it calls the interrupt management interface 230 in the interrupt management mechanism 122. In response, the interrupt management mechanism 122 determines the source of the interrupt, determines which virtual processor should handle the interrupt, and enqueues the interrupt for the virtual processor. Once the virtual processor is running on a physical processor, the partition will invoke the interrupt management mechanism 122, which will then communicate the enqueued interrupt(s) to the virtual processor. The virtual processor may then process the interrupt(s). In this manner, interrupts may be routed to any executing virtual processor, and may also be enqueued for any virtual processor that is not currently executing.

One important feature of system 200 shown in FIG. 2 is that the interrupt processing model for each operating system 126 does not have to change to function correctly in a logically partitioned computer system. All of the overhead for virtualizing the interrupts is performed within the resource and partition manager 121. Each operating system 126 can't tell the difference between an interrupt from an I/O device in a system that only has dedicated processor partitions and an interrupt from interrupt management mechanism 122. In this manner, the interrupt processing model for each operating system 126 is preserved the same as when the operating system is executing on a computer system with dedicated processor partitions. This is a significant feature because it allows virtualization of interrupts without requiring any changes to the operating systems 126 in the respective logical partitions 125.

Figure 3:
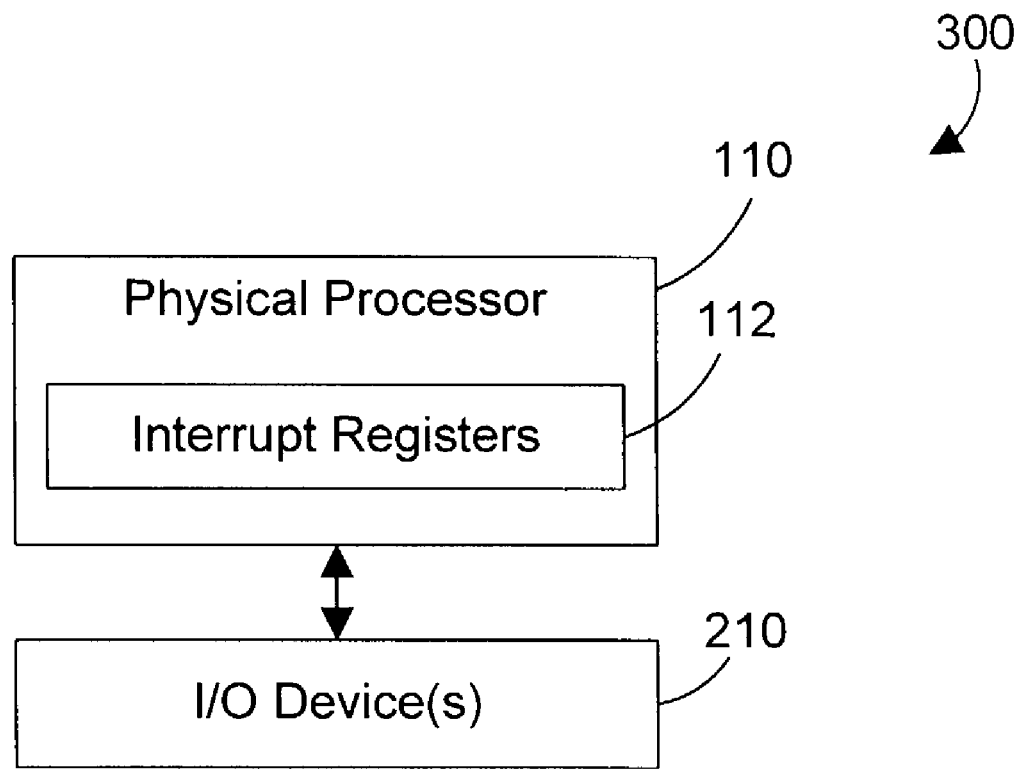
FIG. 3 is a block diagram of portions of a simple prior art single-processor computer system.

A specific example is now presented to provide a context for discussing the preferred embodiments, and for comparing and contrasting the preferred embodiments with the prior art. Referring to FIG. 3, a simple computer system 300 may include a physical processor 110 coupled to one or more I/O devices 210. Physical processor 110 typically includes interrupt registers 112 that determine how physical processor 110 handles interrupts received from I/O devices 210. There are numerous different computer architectures that are commercially known. One of these is the PowerPC architecture. Some of the interrupt registers used in the PowerPC architecture are shown in FIG. 4.

The CPPR register is the Current Processor Priority Register. Only interrupts that have a value greater than the value stored in the CPPR are presented to the associated processor. The XISR register is the eXternal Interrupt Source Register. The XISR identifies the source of an I/O interrupt presented to the associated processor. The XIRR register is the eXternal Interrupt Request Register, which is a concatenation of the CPPR and XISR, as shown in FIG. 4. The MFRR register is the Most Favored Request Register. The MFRR is used to present an inter-processor interrupt (IPI) to the associated processor.

Figure 4:
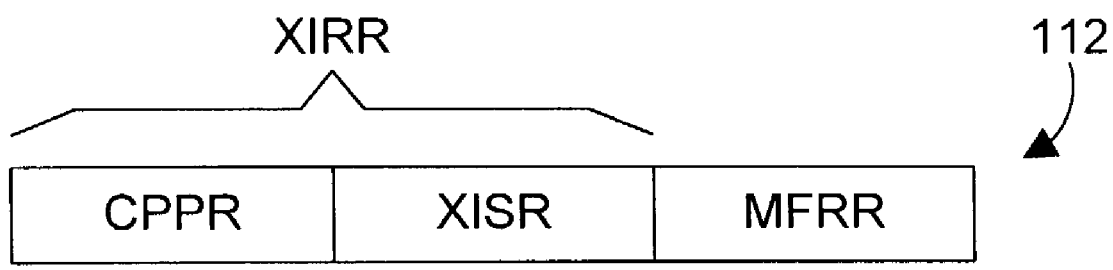
FIG. 4 is a block diagram showing interrupt registers defined in the PowerPC architecture.
Figure 5:
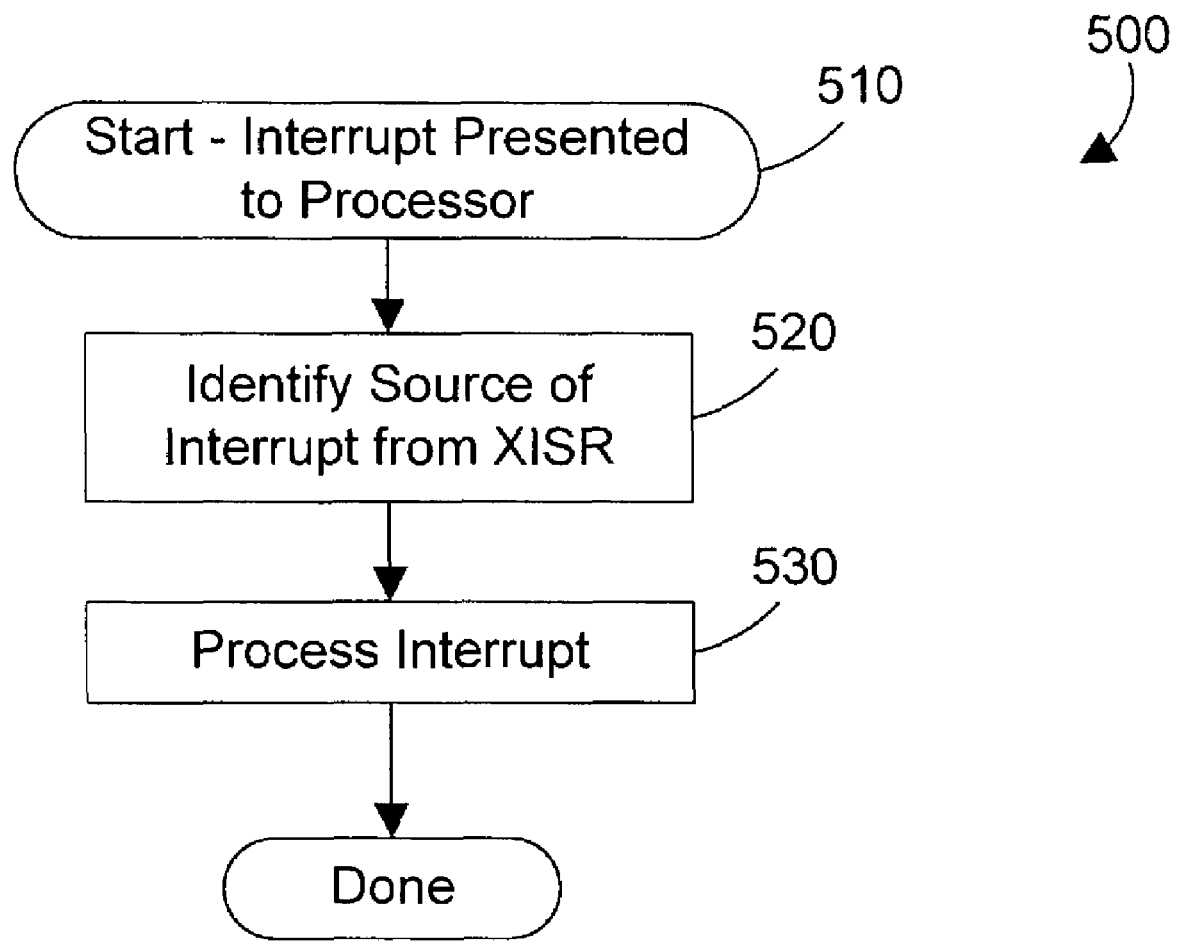
FIG. 5 is a flow diagram of a prior art method for the processor of FIG. 3 to process interrupts.

A method 500 for handling interrupts in a system 300 of FIG. 3 that includes PowerPC interrupt registers as shown in FIG. 4 is shown in the flow diagram of FIG. 5. Method 500 begins when an interrupt is presented to the processor (step 510). The interrupt may be an I/O interrupt, or may be an interprocessor interrupt (IPI). Note that the interrupt is only presented to the processor if priority of the interrupt exceeds the value in the CPPR. In response to presenting an interrupt to the processor in step 510, the source of the interrupt is identified from the XISR register (step 520), and the interrupt is then processed (step 530).

Figure 6:
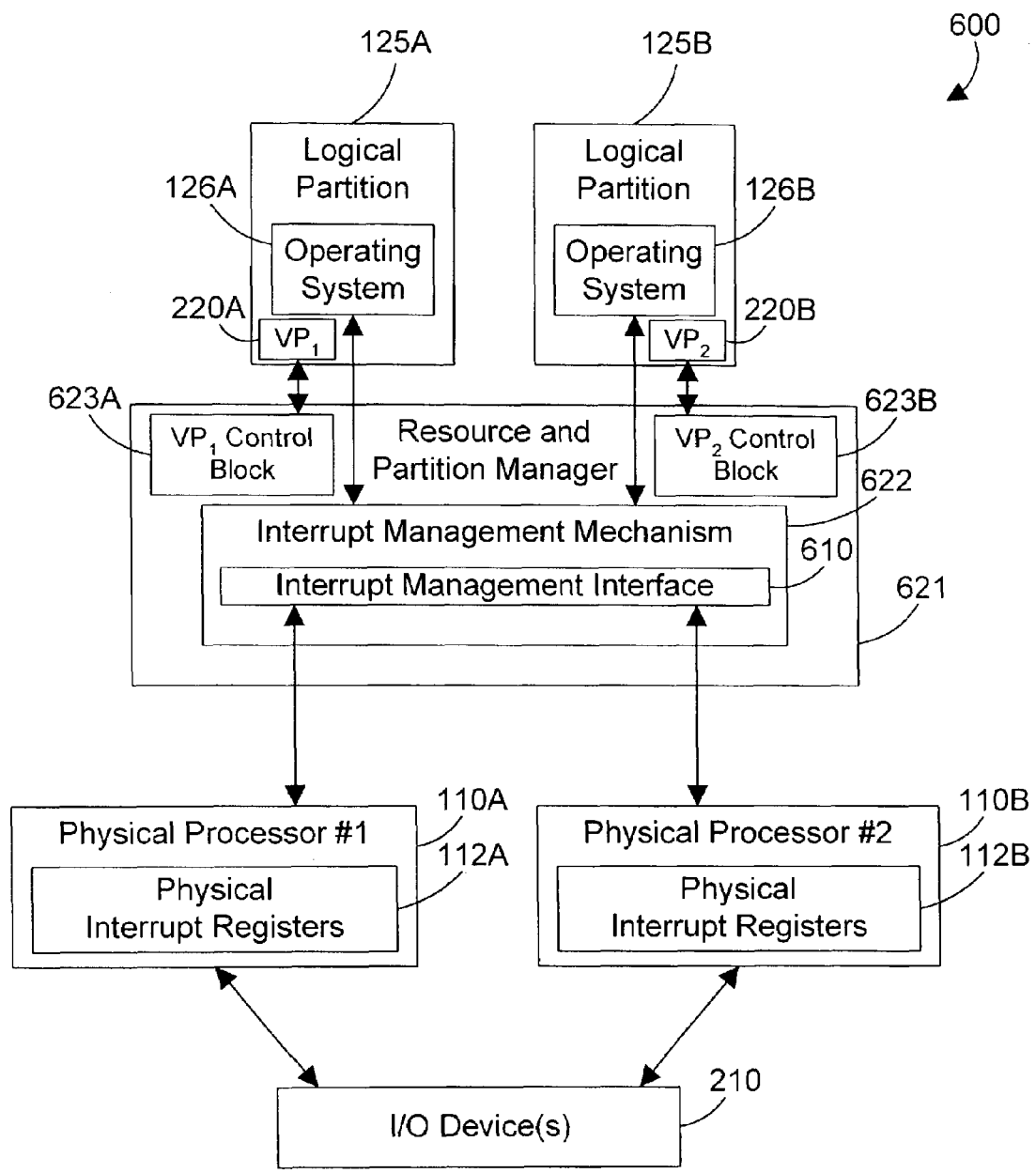
FIG. 6 is a block diagram of a prior art logically partitioned computer system with dedicated processors.

One specific example of a computer system 600 in accordance with the prior art is shown in FIG. 6. This system 600 is a dedicated processor system, meaning that each logical partition includes one or more processors that are dedicated to the logical partition (and therefore do no work for any other logical partition in the system). System 600 includes two logical partitions 125A and 125B with their corresponding operating systems 126A and 126B. We assume that each logical partition includes a single dedicated processor, so logical partition 125A includes a single virtual processor VP1 (220A) that corresponds to the single physical processor allocated to logical partition 125A, and logical partition 125B likewise includes a single virtual processor VP2 (220B) that corresponds to the single physical processor allocated to logical partition 125B. The resource and partition manager 621 includes two virtual processor control blocks 623A and 623B that interact with the interrupt management mechanism 622 to process interrupts received by the interrupt management mechanism 622 from physical processors 110A and 110B, which receive interrupts from one or more I/O devices 210.

Each physical processor 110A and 110B is associated with corresponding physical interrupt registers 112A and 112B, respectively. Interrupt management mechanism 622 preferably includes an interrupt management interface 610 that is invoked by a physical processor to allow interrupt management mechanism 622 to handle interrupts and to direct those interrupts to the appropriate virtual processor in the appropriate logical partition. Functions provided by interrupt management interface 610 are shown in table 700 in FIG. 7. When the h_xirr function is invoked on the interrupt management interface 610, the interrupt management mechanism 622 reads the XIRR register with side effects from the processor that received the interrupt. A read with side effects means that the software or firmware is accepting the interrupt, so the interrupt is no longer pending in hardware after the read with side effects. The CPPR for that processor is then set to the priority of the accepted interrupt. The h_cppr function is invoked to set the CPPR register on the invoking processor to the specified value. The h_ipoll function is used to poll the XIRR and MFRR registers on the specified target processor to check for pending interrupts. The h_ipi function is called to sent an interprocessor interrupt (IPI) to a specified target processor by writing the MFRR of the target processor with a value that indicates an interprocessor interrupt. The h_eoi function is called to signal the end of an interrupt to the interrupt hardware by writing a specified value to the XIRR register on the associated processor.

The functions in FIG. 7 allow the interrupt management mechanism 621 to receive and process interrupts in a logically partitioned computer system with dedicated processors. Note, however, that logical partitions do not necessarily have dedicated processors. It is possible to define logical partitions that execute on a common processor. In this shared processor scenario, there is no direct correlation between a virtual processor and physical interrupt registers 112 in a physical processor 110, because multiple virtual processors may share a physical processor. For this reason, the resource and partition manager 621 is FIG. 6 is not suitable for a shared processor configuration.

Figure 8:
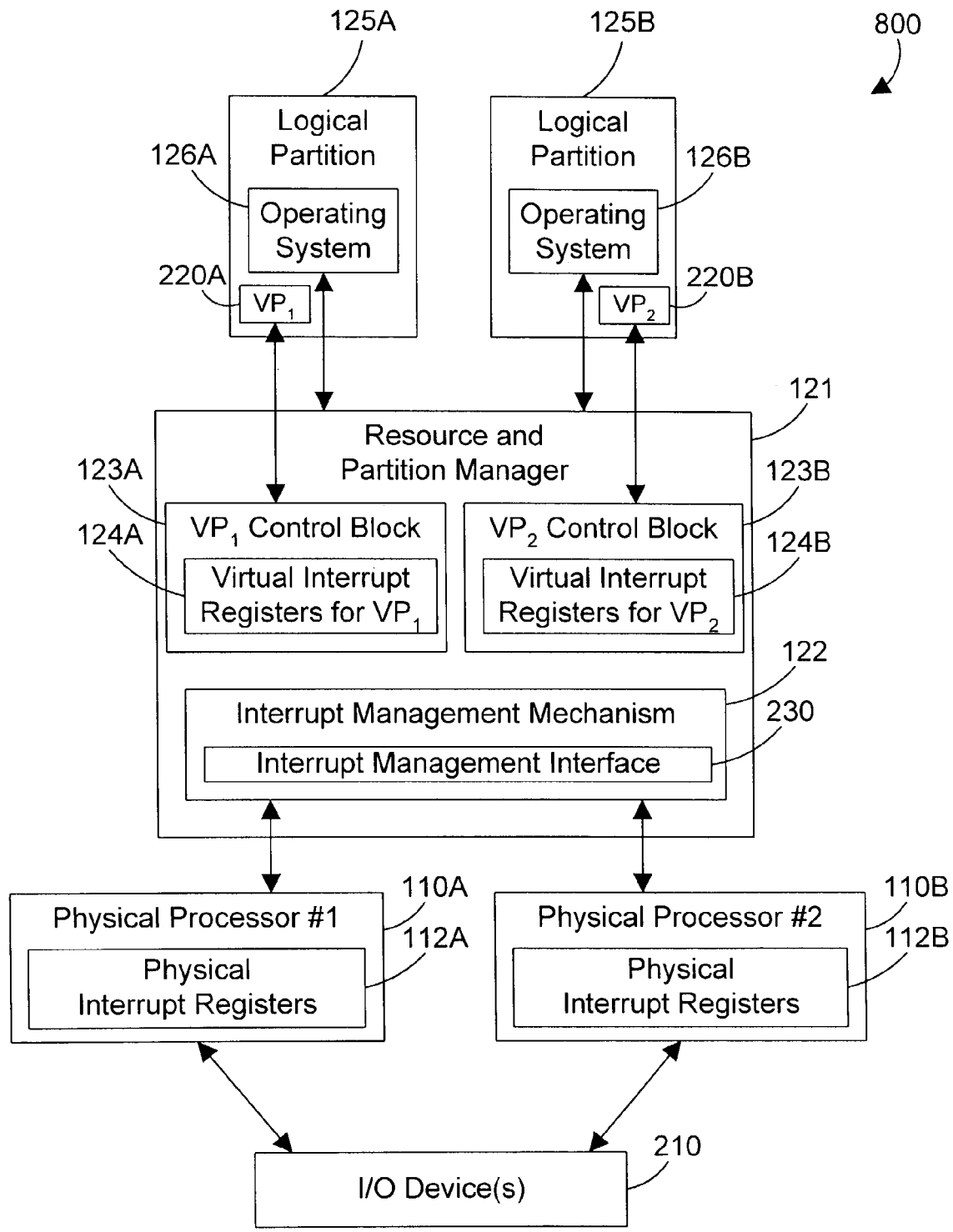
FIG. 8 is a block diagram of a logically partitioned computer system with shared processors in accordance with the preferred embodiments.

Referring now to FIG. 8, a system 800 is shown that is one suitable implementation for system 100 in FIG. 1 and system 200 in FIG. 2. System 800 is a logically partitioned computer system that provides virtualization of interrupts. The system 800 is similar in many ways to system 600 in FIG. 6. System 800 contains the same two logical partitions 125A and 125B that execute the same operating systems 126A and 126B and that define the same two virtual processors 220A and 220B. The physical processors 110A and 110B include physical interrupt registers 112A and 112B, respectively, and are coupled to I/O devices 210 that may generate interrupts. The primary different between system 800 in FIG. 8 and system 600 in FIG. 6 lies within the resource and partition manager 121. Resource and partition manager 121 includes a virtual processor control block 123 for each virtual processor in system 800. In the specific example of system 800 in FIG. 8, there are two virtual processors 220A and 220B, so there are two corresponding virtual processor control blocks 123A and 123B, respectively. Each virtual processor control block 123 preferably includes a set of virtual interrupt registers 124. These virtual interrupt registers preferably have the same names and functions as the physical interrupt registers 112 within a processor 110. Thus, if processors 110A and 110B in FIG. 8 are PowerPC processors, the physical interrupt registers will include a CPPR register, an XISR register, an XIRR register, and an MFRR register, as shown in FIG. 4. Likewise, each set of virtual interrupt registers will likewise define a virtual CPPR register, a virtual XISR register, a virtual XIRR register, and a virtual MFRR register. Thus, in FIG. 8, $VP_1$ control block 123A includes a set of corresponding virtual interrupt registers 124A for VP, while $VP_2$ control block 123B includes a set of corresponding virtual interrupt registers 124B for $VP_2$. Once we define a set of virtual interrupt registers for each virtual processor, the interrupt management mechanism 122 can keep track of the status of interrupts using the virtual interrupt registers 124 that correspond to a processor instead of using only the physical interrupt registers 112.

Interrupt management mechanism 122 includes an interrupt management interface 230 that defines functions that may be called by a physical processor 110 to process interrupts generated by I/O devices 210. The functions defined by interrupt management interface 810 are shown in table 900 in FIG. 9. When the h_xirr function is invoked, the calling processor's XIRR is read with side effects. The corresponding virtual processor's virtual CPPR is set to the priority of the interrupt taken by the partition. The h_cppr function is invoked to set the calling virtual processor's virtual CPPR to a specified value. The h_ipoll function is invoked to poll the target virtual processor's virtual XIRR and virtual MFRR registers to check for pending interrupts. The h_ipi function is invoked to send an interprocessor interrupt (IPI) to the specified virtual target processor by writing the associated virtual MFRR with a specified value. The h_eoi function is invoked to signal the end of an interrupt to the interrupt hardware by writing a specified XIRR value to the associated XIRR on the physical processor on which the call was made. Note that h_eoi writes to the XIRR hardware register on a processor, not to the virtual XIRR register corresponding to a virtual processor.

FIG. 8 shows the simple case of two logical partitions that each contain a single virtual processor that each correspond to a physical processor. Note, however, that the principles of the preferred embodiments expressly extend to any suitable number of virtual processors, including shared processors.

The virtualization of interrupts provided by having a set of virtual interrupt registers dedicated to each virtual processor allows processing interrupts for virtual processors that share a physical processor. Thus, logical partition 125A could have a second virtual processor (called VP₃) in addition to VP, 220A, for a total of three virtual processors in system 800. If there were a third virtual processor, there would also be a corresponding VP₃ control block, and a corresponding set of virtual interrupt registers for VP₃. Of course, these concepts may be extended to any suitable number or configuration for virtual processors in a logically partitioned computer system, whether some of the processors are dedicated to a physical processor or whether multiple virtual processors share a physical processor.

Figure 10:
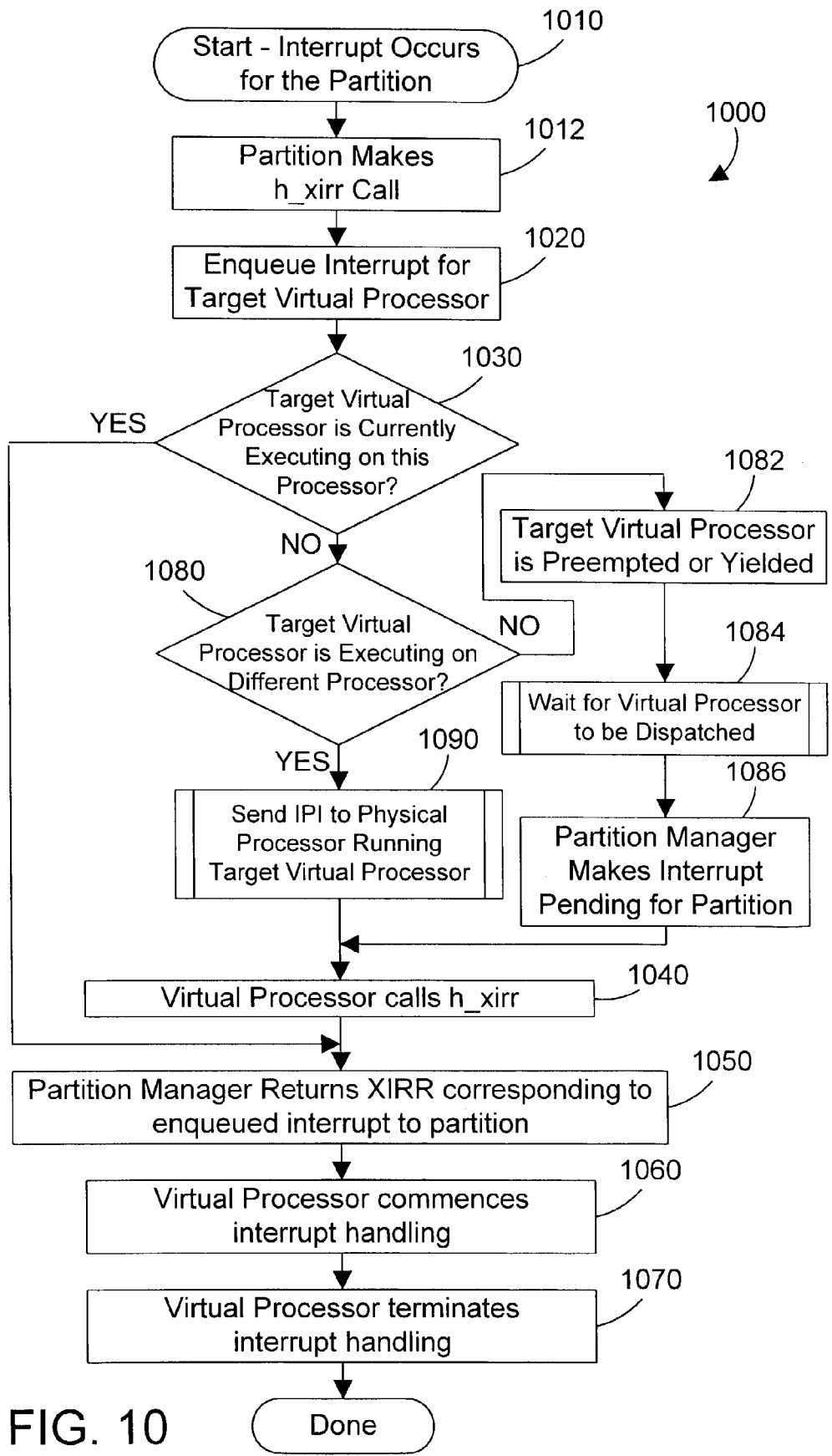
FIG. 10 is a flow diagram of a method for processing virtual interrupts in accordance with the preferred embodiments.

Referring now to FIG. 10, a method 1000 for processing interrupts in a logically partitioned computer system in accordance with the preferred embodiments begins when an interrupt occurs for a logical partition (step 1010). Note that the interrupt may be a hardware interrupt generated by any suitable hardware, or may be an interrupt that is generated by software for a virtual I/O device. The partition manager makes the h_xirr call to determine which virtual processor the interrupt is meant for (step 1012), and writes the interrupt to a queue that corresponds to the target virtual processor (step 1020). In this manner, multiple interrupts may be queued up and waiting for a virtual processor to be dispatched to a physical processor. If the target virtual processor is currently executing on the processor that presented the interrupt (step 1030=YES), the partition manager returns the value in the XIRR register corresponding to the enqueued interrupt to the partition (step 1050), and the enqueued XIRR is removed from the virtual processor queues. The virtual processor then commences handling the interrupt (step 1060). Once interrupt handling is complete, the virtual processor invokes the h_eoi function on the interrupt management interface to indicate that interrupt processing is complete (step 1070).

If the target virtual processor is not currently executing on the processor that received the interrupt (step 1030=NO), step 1080 checks to see if the target virtual processor is executing on a different processor. If so (step 1080=YES), an interprocessor interrupt (IPI) is sent to the physical processor running the target virtual processor (step 1090) by storing a value into the MFRR register of the target physical processor. When the virtual processor gets control at its external handler, it invokes the h_XIRR function on the interrupt management interface (step 1040), which polls the interrupt queues for the virtual processor. In response, the partition manager returns the value in the XIRR register corresponding to the enqueued interrupt to the partition (step 1050). The virtual processor then commences interrupt handling (step 1060). Once interrupt handling is complete, the virtual processor invokes the h_eoi function on the interrupt management interface to indicate that interrupt processing is complete (step 1070).

If the virtual processor is not executing on a different processor (step 1080=NO), the virtual processor is preempted or yielded (step 1082). Method 1000 then waits for the virtual processor to be dispatched (step 1084). Once the virtual processor is dispatched to a physical processor, the partition manager makes an interrupt pending for the partition (step 1086) by writing to the physical MFRR corresponding to the physical processor. The virtual processor then calls h_xirr (step 1040). In response, the partition manager returns the value in the XIRR register corresponding to the enqueued interrupt to the partition (step 1050). The virtual processor then commences interrupt handling (step 1060). Once interrupt handling is complete, the virtual processor invokes the h_eoi function on the interrupt management interface to indicate that interrupt processing is complete (step 1070).

One significant advantage provided by the preferred embodiments is that the operating systems in the logical partitions function just like they do when they run in a computer system that contains only dedicated processor partitions. In other words, the interrupt processing model of the operating system does not change. The interrupt management mechanism does all the work to transform interrupts from physical processors and to route those interrupts to the appropriate virtual processor in the appropriate logical partition. The interrupt management mechanism thus provides a way to process virtual interrupts in a logically partitioned computer system that may contain shared processors without changing the interrupt processing model for operating systems in the logical partitions.

Another significant advantage of the preferred embodiments is that the interrupt management mechanism presents interrupts to the logical partitions instead of the hardware. As a result, other virtual interrupts may be generated by the interrupt management mechanism and presented to the logical partitions as if they were hardware interrupts. For example, a virtual local area network (VLAN) could be defined between logical partitions, and a virtual interrupt could be defined within the interrupt management mechanism that indicates when data is available to be read on the VLAN. Of course, numerous other virtual interrupts could be defined, and the preferred embodiments expressly extend to any and all virtual interrupts, whether corresponding to hardware interrupts or not.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   a processor;
   a memory coupled to the processor;
   a plurality of logical partitions defined on the apparatus;
   at least one virtual interrupt register residing in the memory that each corresponds to a physical interrupt register residing in the processor; and
   an interrupt management mechanism residing in the memory and executed by the processor that uses the at least one virtual interrupt register to process a plurality of interrupts.

2. The apparatus of claim 1 further comprising a plurality of virtual processors defined in the plurality of logical partitions, wherein each virtual processor defines a set of virtual interrupt registers residing in the memory that correspond to a set of physical interrupt registers residing in the processor.

3. The apparatus of claim 1 wherein the interrupt management mechanism resides in a resource and partition manager that manages the plurality of logical partitions.

4. An apparatus comprising:
   a processor;
   a memory coupled to the processor;
   a plurality of logical partitions defined on the apparatus, each logical partition including a corresponding operating system;

an interrupt management mechanism residing in the memory and executed by the processor that processes a plurality of interrupts in a manner that is consistent with an interrupt processing model for the corresponding operating system when the corresponding operating system executes on a computer system that contains only dedicated processor partitions; and at least one virtual interrupt register residing in the memory that each corresponds to a physical interrupt register residing in the processor.

5. The apparatus of claim 4 wherein the interrupt management mechanism resides in a resource and partition manager that manages the plurality of logical partitions.

6. An apparatus comprising:
a processor;
a memory coupled to the processor;
a plurality of logical partitions defined on the apparatus, each logical partition including a corresponding operating system;
an interrupt management mechanism residing in the memory and executed by the processor that processes a plurality of interrupts in a manner that is consistent with an interrupt processing model for the corresponding operating system when the corresponding operating system executes on a computer system that contains only dedicated processor partitions; and
a plurality of virtual processors defined in the plurality of logical partitions, wherein each virtual processor defines a set of virtual interrupt registers residing in the memory that correspond to a set of physical interrupt registers residing in the processor.

7. A computer-implemented method for processing interrupts in a computer system that includes a plurality of logical partitions, the method comprising the steps of:
defining a plurality of virtual interrupt registers that each corresponds to a physical interrupt register residing in a processor; and
using the plurality of virtual interrupt registers to process interrupts.

8. The method of claim 7 further comprising the step of defining a plurality of virtual processors in the plurality of logical partitions, wherein each virtual processor defines a set of virtual interrupt registers that correspond to a set of physical interrupt registers residing in the processor.

9. The method of claim 7 wherein the processing of interrupts is performed by an interrupt management mechanism that resides in a resource and partition manager that manages the plurality of logical partitions.

10. A computer-implemented method for processing interrupts in a computer system that includes a plurality of logical partitions, wherein each logical partition includes a corresponding operating system, the method comprising the steps of:
presenting a plurality of interrupts to an interrupt management mechanism;
the interrupt management mechanism processing the plurality of interrupts for a logical partition in a manner that is consistent with an interrupt processing model for the corresponding operating system when the corresponding operating system executes on a computer system that contains only dedicated processor partitions; and
defining a plurality of virtual interrupt registers that each corresponds to a physical interrupt register residing in a processor, wherein the interrupt management mechanism processes the plurality of interrupts using the plurality of virtual interrupt registers.

11. The method of claim 10 wherein the interrupt management mechanism resides in a resource and partition manager that manages the plurality of logical partitions.

12. A computer-implemented method for processing interrupts in a computer system that includes a plurality of logical partitions, wherein each logical partition includes a corresponding operating system, the method comprising the steps of:
presenting a plurality of interrupts to an interrupt management mechanism; and
the interrupt management mechanism processing the plurality of interrupts for a logical partition in a maimer that is consistent with an interrupt processing model for the corresponding operating system when the corresponding operating system executes on a computer system that contains only dedicated processor partitions; and
defining a plurality of virtual processors in the plurality of logical partitions, wherein each virtual processor defines a set of virtual interrupt registers that corresponds to a set of physical interrupt registers residing in a processor, wherein the interrupt management mechanism processes a selected interrupt by interacting with the set of virtual interrupt registers that corresponds to the virtual processor corresponding to the selected interrupt.

13. A computer readable recording medium storing a program comprising:
an interrupt management mechanism that uses at least one virtual interrupt register to process a plurality of interrupts in a computer system that includes a plurality of logical partitions, wherein each virtual interrupt register corresponds to a physical interrupt register residing in a processor; and
recordable signal bearing media bearing the interrupt management mechanism.

14. The computable readable recording medium storing a program of claim 13 further comprising a plurality of virtual processors defined in the plurality of logical partitions, wherein each virtual processor defines a set of virtual interrupt registers that correspond to a set of physical interrupt registers residing in the processor.

15. The computable readable recording medium storing a program of claim 13 wherein the interrupt management mechanism resides in a resource and partition manager that manages the plurality of logical partitions.

16. A computer-readable recording medium storing a program comprising:
an interrupt management mechanism that processes a plurality of interrupts in a computer system that includes a plurality of logical partitions that each include a corresponding operating system in a manner that is consistent with an interrupt processing model for the corresponding operating system when the corresponding operating system executes on a computer system that contains only dedicated processor partitions, the interrupt management mechanism including at least one virtual interrupt register that each corresponds to a physical interrupt register residing in a processor; and
recordable signal bearing media bearing the interrupt management mechanism.

17. The computer readable recording medium storing a program of claim 16 wherein the interrupt management mechanism resides in a resource and partition manager that manages the plurality of logical partitions.

18. A computer-readable recording medium storing a program comprising:

an interrupt management mechanism that processes a plurality of interrupts in a computer system that includes a plurality of logical partitions that each include a corresponding operating system in a manner that is consistent with an interrupt processing model for the corresponding operating system when the corresponding operating system executes on a computer system that contains only dedicated processor partitions, the interrupt management mechanism including a plurality of virtual processors defined in the plurality of logical partitions, wherein each virtual processor defines a set of virtual interrupt registers that correspond to a set of physical interrupt registers residing in a processor; and recordable signal bearing media bearing the interrupt management mechanism.

\* \* \* \* \*